United States Patent [19]

Shiraishi et al.

[11] 3,911,089

[45] Oct. 7, 1975

[54] PROCESS FOR PREPARING HYDROGEN CYANIDE

[75] Inventors: Tatsuo Shiraishi; Hiroshi Ichihashi; Fumiyoshi Kato, all off Niihama, Japan

[73] Assignee: Sumitomo Chemical Company, Limited, Japan

[22] Filed: Oct. 4, 1973

[21] Appl. No.: 403,722

[30] Foreign Application Priority Data
Oct. 6, 1972 Japan.............................. 47-10085
Jan. 24, 1973 Japan.............................. 48-10461

[52] U.S. Cl............................. 423/376; 260/465.3
[51] Int. Cl.²................ C01C 3/02; C07C 120/02
[58] Field of Search................. 423/376; 260/465.3; 252/461

[56] References Cited
UNITED STATES PATENTS
1,934,838  11/1933  Andrussow ...................... 423/376
2,006,981  7/1935   Andrussow ...................... 423/376
2,697,066  12/1954  Sieg .................................. 252/461
2,746,843  5/1956   Bellringer ......................... 423/376
3,232,978  2/1966   Yasuhara et al. ............... 260/465.3

*Primary Examiner*—Earl C. Thomas
*Attorney, Agent, or Firm*—Stewart and Kolasch, Ltd.

[57] ABSTRACT

A process for preparing hydrogen cyanide which comprises reacting methanol or formaldehyde or their mixture, ammonia and oxygen in the presence of a catalyst composition at a temperature of 250° to 550°C and a space velocity of 50 to 5,000 hr$^{-1}$ under a pressure of 0.5 to 10 atm., the said catalyst composition comprising a catalyst system of the formula: $Mo_aBi_bFe_cX_dY_eZ_fO_g$ wherein X is one or more of Cr, Mn, Co, Ni, Zn, Cd, Sn, W and Pb, Y is one or more of Tl and elements belonging to Group IA or IIA in the periodic table, Z is one or more of P, As and Sb and $a, b, c, d, e, f$ and $g$ represent respectively the number of atoms and are respectively 12, 0.1 to 24, 0 to 24, 0 to 15, 0 to 15, 0 to 5 and the total number of the oxygen atoms in the oxides of the other atoms.

23 Claims, No Drawings

PROCESS FOR PREPARING HYDROGEN CYANIDE

The present invention relates to a process for preparing hydrogen cyanide. It also relates to a process for preparing hydrogen cyanide and an unsaturated nitrile at the same time.

As is well known, hydrogen cyanide is an important substance which is frequently employed as the starting material for various organic reactions, and its consumption is expected to be increased more and more.

Industrially, hydrogen cyanide has been mainly produced by the ammoxidation of methane (Andrussow process) and is also obtained as the by-product in the preparation of acrylonitrile by the ammoxidation of propylene (SOHIO process). However, the Andrussow process is disadvantageous in that the yield is not satisfactory and the reaction requires such a high temperature as 1000°C. Further, as to the ammoxidation of propylene, the yield of hydrogen cyanide as the by-product tends to be lowered, while that of acrylonitrile as the main product has become increased, as the result of studies during the past ten years for improvement of the catalyst to be used in the reaction. The decrease in the yield of hydrogen cyanide has a serious influence on processes where hydrogen cyanide is employed as the starting material.

Since hydrogen cyanide is extremely poisonous to living bodies, its transportation in large amounts is very difficult both at sea and land, as in the case of the transportation of methane which has hitherto been employed as the starting material for production of hydrogen cyanide. Therefore, it is an advantageous system from the viewpoint of safety that hydrogen cyanide is prepared from a starting compound which can be transported and handled with ease in a factory where hydrogen cyanide is necessitated as occasion demands, and the produced hydrogen cyanide is immediately used.

As the mass production of methanol with a low cost has recently become possible, the employment of methanol as the starting material for production of hydrogen cyanide has been thought of seriously, and there has been proposed a method in which methanol, ammonia and oxygen are reacted in the presence of a catalyst composition containing antimony tetroxide combined or admixed with stannic oxide to obtain hydrogen cyanide in a good yield [British patent No. 913,836]. However, the preparation of the catalyst composition used in this method requires the calcination at such a high temperature as 1000°C for 16 hours.

Since the calcination of the catalyst composition at a high temperature of 1000°C for a long duration of time is apparently not convenient from the industial viewpoint, the appearance of any catalyst composition which may be prepared under milder conditions has been highly desired.

As the result of an extensive study on the preparation of hydrogen cyanide using methanol or formaldehyde or their mixture which can be transported and handled with ease, it has now been found that the ammoxidation of these substances can be advantageously executed by the use of a catalyst composition mainly containing molybdenum and bismuth oxides whose active components correspond to the formula: $Mo_aBi_bFe_cX_dY_eZ_fO_g$ wherein X is one or more of Cr, Mn, Co, Ni, Zn, Cd, Sn, W and Pb, Y is one or more of Tl and elements belonging to Group IA or IIA in the periodic tablee, Z is one or more of P, As and Sb and $a$, $b$, $c$, $d$, $e$, $f$ and $g$ represent, respectively, the number of atoms and are, respectively, $a=12$, $b=0.1$ to 24 (preferably 0.1 to 15), $c=0$ to 24 (preferably 0.1 to 12), $d=0$ to 15 (preferably 2 to 15), $e=0$ to 15 (preferably 0 to 12), and $f=0$ to 5, $g$ being the total number of oxygen atoms and being a number determined by the valence requirements of the other atoms in the catalyst composition.

The catalyst composition according to the present invention can be prepared by a per se conventional manner. For instance, a molybdate such as ammonium molybdate is dissolved in water, if necessary, in the presence of phosphoric acid, and aqueous solutions of water-soluble salts of other metals such as nitrates and acetates are added thereto. The resultant slurry dispersion is admixed with a carrier material and evaporated to dryness. The thus obtained cake is shaped and calcined at 300° to 900°C in the atmosphere to give the catalyst composition.

The catalyst composition of the invention may be used as such but is favorably incorporated with a suitable carrier material (e.g., silica, alumina, diatomaceous earth, silicon carbide, titanium oxide). The amount of the carrier is varied depending on its kind and on the components of the catalyst composition and may be usually 90% by weight or less, preferably from 5 to 90% by weight, of the catalyst composition.

The catalyst composition of the invention may be used in a fluidized bed or in a fixed bed. The particle size of the catalyst composition is not particularly limited and may be optionally varied with the type of its use.

The reaction of methanol or formaldehydes or their mixture with ammonia and oxygen in the presence of the catalyst composition to form hydrogen cyanide is represented by the following formulae:

$$CH_3OH + NH_3 + O_2 \rightarrow HCN + 3 H_2O \qquad (1)$$
$$HCHO + NH_3 + \tfrac{1}{2} O_2 \rightarrow HCN + 2 H_2O \qquad (2)$$

In case that the ammoxidation of propylene or isobutylene is executed in the presence of methanol or formaldehyde or a mixture thereof, the said reactions represented by the formulae (1) and (2) proceed apart from the ammoxidation reaction of the olefin without any undesirable influence thereon such as deactivation of the catalytic activity on the ammoxidation reaction of the olefin or occurrence of a side reaction between methanol and the produced unsaturated nitrile to contaminate the resulting product. As the byproducts derived from methanol or formaldehyde, there is confirmed the formation of only carbon monoxide and carbon dioxide. It is also confirmed that, depending on the specific catalyst composition, the yield of acrylonitrile in the ammoxidation of propylene is rather increased by the presence of methanol or formaldehyde or their mixture.

These can be evidenced, for instance, from the results as shown in Table A which were obtained in the experiments where the ammoxidation of propylene in the presence of methanol was carried out using a catalyst composition as prepared in Example 1 and varying the molar ratio of methanol to propylene in a glass made tube reactor of 12 mm in inner diameter: amount of the catalyst composition used, 6 g; space velocity, 1000 hr⁻¹; reaction temperature, 410°C; initial partial pressure of ammonia, 0.064 atm.; initial partial pressure of oxygen, 0.127 atm.; initial partial pressure of steam, 0.403 atm.; initial partial pressure of argon, 0.357 atm.; sum of initial partial pressures of propylene and methanol, 0.049 atm.

and 20 or less (favorably 1 to 15), respectively. The space velocity may be 50 to 5000 hr$^{-1}$ (favorably 100 to 2,000 hr$^{-1}$). The reaction is carried out usually under an atmospheric pressure. If desired, an elevated pressure up to about 10 atm. or a reduced pressure down to about 0.5 atm. may be also adopted.

TABLE A

| Experiment No. | Molar ratio of CH$_3$OH to C$_3$H$_6$ | Amount of propylene (mmol/min) | Amount of methanol (mmol/min) | Conversion of propylene (%) | Selectivity* to acrylonitrile (%) | Yield of hydrogen cyanide (mmol/min) |
|---|---|---|---|---|---|---|
| 1 | 0.00 | 0.223 | 0.00 | 59 | 80 | 0.0282 |
| 2 | 1.03 | 0.110 | 0.113 | 62 | 86 | 0.0957 |
| 3 | 2.01 | 0.075 | 0.151 | 63 | 93 | 0.126 |
| 4 | 7.24 | 0.025 | 0.181 | 66 | 95 | 0.135 |

*Selectivity to acrylonitrile (%) = $\dfrac{\text{Amount of produced acrylonitrile (mol)}}{\text{Amount of reacted propylene (mol)}} \times 100$ From the results obtained in Experiment No. 1, it is calculated that 0.126 mmol of hydrogen cyanide is formed from 1 mmol of propylene, when methanol is absent. Assuming that this proportion is not changed by the presence of methanol, the amount of hydrogen cyanide produced from 1 mmol of propylene, for example, in Experiment No. 3 is calculated to be 0.010 mmol so that the amount of hydrogen cyanide produced from methanol is 0.116 mmol and the conversion of methanol into hydrogen cyanide is 77%.

In these experiments, it is interesting that the selectivity to acrylonitrile is increased with the increase of the molar ratio of methanol to propylene. In all of Experiments Nos. 2 to 4, the conversion of methanol is substantially 100%, because the reaction product contains only a trace of methanol.

In executing the ammoxidation of propylene in the presence of methanol or formaldehyde or their mixture, there arises no trouble such as the shortening of the catalytic life of the catalyst composition, the blocking of the reaction apparatus or the like. Thus, in the method according to the invention, any conventional reactor heretofore employed in the ammoxidation reaction of propylene or isobutylene can be utilized effectively without any serious change.

It is confirmed that, in the ammoxidation of propylene in the presence of methanol, the highest yield of hydrogen cyanide, i.e., the highest conversion efficiency of methanol into hydrogen cyanide, can be achieved when the reaction is carried out under such a reaction condition that methanol is hardly detected from the reaction product. This is extremely advantageous in the execution of the method according to the invention, because the recovery of unreacted methanol is not necessitated at all and the purification can be performed without any additional and complicated operations. Thus, the process for production of hydrogen cyanide according to the invention can be advantageously executed in the presence of an olefin as in its absence.

Illustrating the ammoxidation of methanol or formaldehyde or their mixture in the absence of an olefin more in details, the reaction may be executed at a temperature from 250° to 550°C, preferably from 300° to 500°C. The molar ratio of ammonia, oxygen and steam to methanol or formaldehyde or their mixture may be 0.7 to 3 (favorably 0.9 to 2.0) 1 to 5 (favorably 1 to 3)

Illustrating the ammoxidation in the presence of an olefin more in details, methanol or formaldehyde or their mixture, propylene or isobutylene, ammonia and oxygen are subjected to reaction. No particular limitation is present on the concentration and the grade of methanol and formaldehyde. The amount of methanol or formaldehyde or their mixture to be used may be optionally determined, without particular limitation. But, the molar ratio of methanol or formaldehyde or their mixture to the olefin may be usually not more than 3, preferably 0.05 to 1.

Ammonia is used in a somewhat larger amount than in case of the preparation of an unsaturated nitrile alone, because it is also consumed in the reaction with methanol or formaldehyde or their mixture to form hydrogen cyanide. Usually, a desirable molar ratio of ammonia to the combined amount of methanol or formaldehyde or their mixture and the olefin is 0.7 to 2, preferably 0.9 to 1.3. The use of a smaller amount of ammonia is disadvantageous, because the yield of acrolein or methacrolein is increased. On the other hand, the use of a larger amount of ammonia is economically undesirable, because of the necessity of the separation or recovery of unreacted materials.

As the oxygen source, the use of air is economically favorable. In the usual procedure, the oxygen source is employed in such an amount that 0.05 to 6% by volume, favorably 0.1 to 3% by volume, of oxygen is contained in the gaseous reaction product (i.e., non-condensed gas) formed during the reaction. Therefore, the amount of the oxygen source to be supplied to the reaction system should be controlled by measuring the oxygen content in the gas, e.g., by the gas chromatographic analysis. When oxygen remains absent from the reaction product gas for a long period of time, there are caused undesirable situations such as the reduction of the catalyst composition to lose its activity, the deposition of carbonaceous substances and the like. When the oxygen source is used in such a large amount that the oxygen content in the gas becomes larger than 6% by volume, the combustion of the products may occur at the outlet of the reaction vessel, and besides, the operations for the recovery and the purification of the reaction products become complicated and troublesome.

The reaction temperature may be 300° to 550°C, favorably 350° to 500°C, as in the case of a conventional ammoxidation reaction of an olefin. The reaction is usually executed under an atmospheric pressure. If desired, it may be carried out under an elevated pressure up to 10 atm. or a reduced pressure down to 0.5 atm.

For the purpose of suppressing the possibility of explosion and increasing the selectivities to hydrogen cyanide and to the unsaturated nitrile, steam may be incorporated in the reaction system. In such case, steam may be used in a molar ratio of 2 to 15 with respect to the combined amount of the olefin and methanol or formaldehyde or their mixture.

If desired, an appropriate inert gas such as nitrogen, carbon dioxide or argon may be used as a diluent. Further, methanol or formaldehyde or their mixture may be supplied in the form of an aqueous solution to the reaction system.

Practical and presently preferred embodiments of the invention are illustratively shown in the following Examples.

In these Examples, the yield of hydrogen cyanide on the basis of methanol and the conversion of methanol are calculated respectively according to the equations:

$$\text{Yield of hydrogen cyanide } (\%) = \frac{\text{Produced hydrogen cyanide (mol)}}{\text{Feed methanol (mol)}} \times 100$$

$$\text{Conversion of methanol } (\%) = \frac{\text{Reacted methanol (mol)}}{\text{Feed methanol (mol)}} \times 100$$

In case of employing, as the starting material, formalin which is an aqueous solution of formaldehyde containing methanol as the stabilizing agent, the yield of hydrogen cyanide is calculated according to the equation:

$$\text{Yield of hydrogen cyanide } (\%) = \frac{\text{Produced hydrogen cyanide (mol)}}{\text{Feed formaldehyde and methanol (mol)}} \times 100$$

In the ammoxidation of propylene or isobutylene in the presence of methanol or formaldehyde, the conversions of propylene and isobutylene and the yields of acrylonitrile, methacrylonitrile and hydrogen cyanide are calculated respectively according to the equations:

$$\text{Conversion of propylene } (\%) = \frac{\text{Reacted propylene (mol)}}{\text{Feed propylene (mol)}} \times 100$$

$$\text{Conversion of isobutylene } (\%) = \frac{\text{Reacted isobutylene (mol)}}{\text{Feed isobutylene (mol)}} \times 100$$

$$\text{Yield of acrylonitrile } (\%) = \frac{\text{Produced acrylonitrile (mol)}}{\text{Feed propylene (mol)}} \times 100$$

$$\text{Yield of methacrylonitrile } (\%) = \frac{\text{Produced methacrylonitrile (mol)}}{\text{Feed isobutylene (mol)}} \times 100$$

Produced amount of hydrogen cyanide (mmol.g-cat$^{-1}$·hr$^{-1}$)

$$= \frac{\text{Amount of hydrogen cyanide produced per hour (mmol/hr)}}{\text{Weight of catalyst (g)}}$$

EXAMPLE 1

The solutions of designed concentrations as shown in Table 1 are each prepared by dissolving the starting materials in water to make 1 liter.

Table 1

| Solution | Concentration (g atom/l) | Feed reagents (% being by weight) | Amount weighed |
|---|---|---|---|
| Mo | 2 | $(NH_4)_6Mo_7O_{24}\cdot 4H_2O$ | 353.2 g |
|  |  | 28 % $NH_4OH$ aq. | 300 ml |
| Bi | 1 | $Bi(NO_3)_3\cdot 5H_2O$ | 485 g |
|  |  | 60 % $HNO_3$ | 100 ml |
| Fe | 2 | $Fe(NO_3)_3\cdot 9H_2O$ | 808 g |
| Ni | 2 | $Ni(NO_3)_3\cdot 6H_2O$ | 582 g |
| Co | 2 | $Co(NO_3)_2\cdot 6H_2O$ | 582.1 g |
| P | 2 | 85 % $H_3PO_4$ | 125.4 ml |
| Tl | 0.2 | $TlNO_3$ | 53.3 g |

The thus prepared bismuth solution (20 ml), iron solution (20 ml), nickel solution (70 ml), cobalt solution (20 ml) and thallium solution (80 ml) are charged in a beaker and admixed to make a mixture (hereinafter referred to as "Mixture I"). In another beaker, the molybdenum solution (120 ml) and phosphorus solution (0.8 ml) are admixed to make a mixture (hereinafter referred to as "Mixture II"). The obtained mixtures I and II are combined together, and silica sol ($SiO_2$, 20% by weight) as a carrier is added thereto under vigorous stirring. The resultant dispersion is evaporated to dryness, and the residue is calcined at 300°C for 3 hours (first calcination), cooled and crushed. The obtained powder is tableted and calcined at 525°C for 6 hours in the atmosphere (second calcination) to give a catalyst composition, whose components correspond to the formula: $Mo_{12}Bi_1Fe_2Ni_7Co_2Tl_{0.8}P_{0.08}O_{50.9}\cdot 15SiO_2$.

In a glass made reaction tube of 12 mm in inner diameter, the catalyst composition obtained above and crushed in particles of 10 to 16 mesh (6.0 g) is charged and heated up to 460°C. Then, a gaseous mixture of methanol, ammonia, oxygen, steam and nitrogen (1 : 1.3 : 1.6 : 5 : 9 in molar ratio) is introduced into the reaction tube at a space velocity of 520 hr$^{-1}$, whereby the following results are obtained: conversion of methanol, 100%; yield of hydrogen cyanide, 84.2%; yield of carbon monoxide, 6.6%; yield of carbon dioxide, 8.3%.

EXAMPLES 2 to 21

As in Example 1, there are prepared the catalyst compositions as shown in Table 3. The concentrations and the starting materials of the used aqueous solutions of a chromium salt, a manganese salt, a zinc salt and a lead salt are as shown in Table 2. All the solutions of the alkali metals and the alkaline earth metals have a concentration of 2 g atm/liter and are prepared by using a nitrate of the metal. As to arsenic and antimony, the suspensions of diarsenic trioxide ($As_2O_3$) and diantimony trioxide ($Sb_2O_3$) in powder form in water are employed.

Using these catalyst compositions, the ammoxidation of methanol is carried out as in Example 1.

The results are shown in Table 3.

EXAMPLE 22

In a glass made reaction tube of 12 mm in inner diameter, the same catalyst composition as in Example 1 (6 g) is charged and heated up to 460°C. An aqueous dilution of formalin (an aqueous solution containing 37% by weight of formaldehyde and about 7% by weight of methanol) is introduced into the reaction tube together with a mixture of ammonia, oxygen and nitrogen, the molar ratio of formaldehyde, methanol, ammonia, oxygen, water and nitrogen being 1 : 0.2 : 1.3 : 1.8 : 6.3 : 10, at a space velocity of 550 $hr^{-1}$, whereby the following results are obtained: conversion of the mixture of formaldehyde and methanol, 99%; yield of hydrogen cyanide, 78%.

EXAMPLE 23

Using the same catalyst composition as in Example 10, the ammoxidation of a mixture of formaldehyde Table 2

| Solution | Cr | Mn | Zn | Pb |
|---|---|---|---|---|
| Concentration (g atm/l) | 0.2 | 1 | 2 | 0.2 |
| Reagent used | $Cr(NO_3)_3 \cdot 9H_2O$ | $Mn(NO_3)_2 \cdot 6H_2O$ | $Zn(NO_3)_2 \cdot 6H_2O$ | $Pb(NO_3)_2$ |

Table 3

| Example | Catalyst Composition | Temperature on 2nd calcination (°C) | Reaction temperature (°C) |
|---|---|---|---|
| 2  | $Mo_{12}Bi_{13}P_1O_{36} \cdot 30SiO_2$ | 550 | 357 |
| 3  | $Mo_{12}Bi_1Fe_2Ni_7Co_2Tl_{0.3}P_{0.04}Sb_1O_{51.7} \cdot 15SiO_2$ | 550 | 440 |
| 3  | $Mo_{12}Bi_{0.3}Fe_2Ni_7Zn_2Tl_{0.3}As_{0.5}O_{50.1} \cdot 15SiO_2$ | 525 | 435 |
| 5  | $Mo_{12}Bi_{1.5}P_1Fe_{1.5}Co_4Na_1O_{56.5} \cdot 60SiO_2$ | 525 | 356 |
| 6  | $Mo_{12}Bi_1P_1Fe_3Co_8Ni_2K_{0.3}O_{52.7} \cdot 30SiO_2$ | 600 | 380 |
| 7  | $Mo_{12}Bi_7P_1Fe_2Co_2Na_1O_{50} \cdot 50SiO_2$ | 600 | 424 |
| 8  | $Mo_{12}Bi_1P_{0.04}Fe_2Ni_7Ca_2Tl_{0.3}O_{50} \cdot 15SiO_2$ | 525 | 388 |
| 9  | $Mo_{12}Bi_1P_{0.04}Co_1Ni_{4.5}Tl_{0.5}O_{47} \cdot 50SiO_2$ | 525 | 405 |
| 10 | $Mo_{12}Bi_1P_{0.04}Fe_2Ni_7Zn_2Tl_{1.6}O_{51.2} \cdot 50SiO_2$ | 525 | 427 |
| 11 | $Mo_{12}Bi_1P_1Fe_6Pb_{0.5}O_{56.5} \cdot 50SiO_2$ | 550 | 385 |
| 12 | $Mo_{12}Bi_2P_1Fe_2Ni_{8.5}Tl_{1.6}O_{54.5} \cdot 13SiO_2$ | 550 | 450 |
| 13 | $Mo_{12}Bi_1P_{0.04}Fe_2Ni_7Tl_{0.3}Pb_2O_{50.9} \cdot 15SiO_2$ | 525 | 440 |
| 14 | $Mo_{12}Bi_1P_{0.04}Fe_1Sr_{8.5}Tl_{0.3}O_{48.2} \cdot 15SiO_2$ | 525 | 450 |
| 15 | $Mo_{12}Bi_1P_{0.04}Fe_2Ni_7Ba_2Tl_{0.3}O_{50.2} \cdot 15SiO_2$ | 525 | 410 |
| 16 | $Mo_{12}Bi_1P_{0.04}Fe_6Ni_7Mn_2Tl_{0.5}O_{58.5} \cdot 15SiO_2$ | 525 | 392 |
| 17 | $Mo_{12}Bi_1P_{0.04}Fe_2Ni_7Zn_2K_1Tl_{0.4}O_{51.4} \cdot 15SiO_2$ | 525 | 433 |
| 18 | $Mo_{12}Bi_1P_{0.04}Fe_2Ni_7Be_2Tl_{0.5}O_{50.5} \cdot 15SiO_2$ | 525 | 410 |
| 19 | $Mo_{12}Bi_1P_{0.04}Fe_6Ni_7Mg_2Tl_{1.2}O_{57.5} \cdot 15SiO_2$ | 525 | 408 |
| 20 | $Mo_{12}Bi_1P_{0.04}Fe_1Ni_{4.5}Co_4Rb_1Tl_{0.3}O_{49.9} \cdot 15SiO_2$ | 525 | 484 |
| 21 | $Mo_{12}Bi_1P_{0.04}Fe_1Ni_{4.5}Co_1Cs_1O_{48.2} \cdot 15SiO_2$ | 525 | 454 |

| Example | Space velocity ($hr^{-1}$) | Starting materials (molar ratio) Methanol | $NH_3$ | $O_2$ | $H_2O$ | $N_2$ | Conversion of methanol (%) | Yield of hydrogen cyanide (%) |
|---|---|---|---|---|---|---|---|---|
| 2  | 610 | 1 | 1.1 | 1.6 | 3.0 | 9.1 | 91   | 52 |
| 3  | 510 | 1 | 1.8 | 1.6 | 5.0 | 8.5 | 100  | 78 |
| 4  | 500 | 1 | 1.2 | 1.6 | 5.0 | 8.5 | 99.3 | 77 |
| 5  | 810 | 1 | 1.4 | 2.9 | 3.0 | 6.5 | 97.9 | 61 |
| 6  | 800 | 1 | 1.0 | 1.4 | 3.0 | 8.2 | 99.0 | 66 |
| 7  | 460 | 1 | 1.1 | 1.5 | 5.0 | 8.9 | 100  | 69 |
| 8  | 500 | 1 | 1.1 | 1.5 | 3.0 | 9.2 | 95.0 | 74 |
| 9  | 690 | 1 | 1.4 | 2.9 | 3.0 | 6.5 | 99.0 | 68 |
| 10 | 460 | 1 | 1.1 | 1.5 | 5.0 | 8.9 | 100  | 78 |
| 11 | 720 | 1 | 1.4 | 2.9 | 3.0 | 6.6 | 99.0 | 57 |
| 12 | 380 | 1 | 1.4 | 1.5 | 5.0 | 8.5 | 100  | 85 |
| 13 | 510 | 1 | 1.4 | 1.6 | 5.0 | 8.5 | 100  | 82 |
| 14 | 490 | 1 | 1.0 | 1.5 | 3.0 | 8.6 | 99.0 | 79 |
| 15 | 490 | 1 | 1.1 | 1.6 | 3.0 | 8.7 | 100  | 66 |
| 16 | 490 | 1 | 1.1 | 1.5 | 3.0 | 8.7 | 99.0 | 65 |
| 17 | 460 | 1 | 1.1 | 1.3 | 5.0 | 8.7 | 97.0 | 69 |
| 18 | 640 | 1 | 1.0 | 1.5 | 3.0 | 8.9 | 100  | 75 |
| 19 | 640 | 1 | 1.0 | 1.6 | 3.0 | 9.0 | 92.0 | 72 |
| 20 | 510 | 1 | 1.1 | 1.4 | 5.0 | 8.4 | 100  | 86 |
| 21 | 510 | 1 | 1.3 | 1.6 | 5.0 | 8.6 | 97.0 | 82 | and methanol is executed under the following conditions: space velocity, 550 hr$^{-1}$; reaction temperature, 434°C; molar ratio of formaldehyde, methanol, ammonia, oxygen, water and nitrogen, 1 : 0.2 : 1.3 : 1.8 : 6.3 : 10. The conversion of the mixture of formaldehyde and methanol is 100% and the yield of hydrogen cyanide is 69%.

EXAMPLE 24

As in Examples 1 and 2, there is prepared the catalyst composition whose components correspond to the formula: $Mo_{12}Bi_1Fe_1Ni_{4.5}Co_4Tl_{0.5}P_{0.08}O_{48.5} \cdot 15SiO_2$.

In a glass made reaction tube of 12 mm in inner diameter, the thus obtained catalyst composition (6 g) is charged and heated up to 430°C. A gaseous mixture of propylene, ammonia, oxygen, steam and nitrogen (1 : 1.2 : 2.4 : 7.0 : 6.7 in molar ratio) is introduced into the reaction tube at a space velocity of 420 hr$^{-1}$, whereby the following results are obtained: conversion of propylene, 96.0%; yield of acrylonitrile, 83.4%; yield of hydrogen cyanide, 0.25 mmol.g-cat$^{-1}$·hr$^{-1}$.

When a gaseous mixture of propylene, methanol, ammonia, oxygen, steam and nitrogen (1 : 0.33 : 1.2 : 2.4 : 6.7 : 6.7 in molar ratio) is contacted with the same catalyst composition under the same conditions as above, the conversion of propylene is 95.6%, the yield of acrylonitrile is 82% and the produced amount of hydrogen cyanide is 0.55 mmol.g-cat$^{-1}$·hr$^{-1}$.

EXAMPLES 25 TO 39

As in Examples 1 and 2, there are prepared the catalyst compositions as shown in Table 5. The concentrations and the starting compounds of the used aqueous solution of a cadmium salt, a tin salt and a tungsten salt are as shown in Table 4.

Table 4

| Solution | Cd | Sn | W |
|---|---|---|---|
| Concentration (g atom/l) | 1 | 1 | 0.5 |
| Reagent used | $Cd(NO_3)_2 \cdot 4H_2O$ | $SnCl_4 \cdot xH_2O$ | $(NH_4)_{10}W_{12}O_{41} \cdot 5H_2O$ Ethanolamine 100 g/l |

Using these catalyst compositions, the ammoxidation of propylene is carried out in the presence or absence of methanol.

The results are shown in Table 5.

Table 5

| Example | Catalyst Composition | Temperature on 2nd calcination (°C) | Reaction temperature (°C) | Space velocity (hr$^{-1}$) |
|---|---|---|---|---|
| 25 | $Mo_{12}Bi_{13}P_1O_{58} \cdot 30SiO_2$ | 550 | 450 | 710 |
| 26 | $Mo_{12}Bi_2Fe_2Ni_7Zn_2Tl_{0.3}P_{0.08}O_{50.2} \cdot 50SiO_2$ | 575 | 430 | 360 |
| 27 | $Mo_{12}Bi_1Fe_2Ni_7Mn_2Tl_{0.3}P_{0.08}O_{52.2} \cdot 15SiO_2$ | 525 | 430 | 510 |
| 28 | $Mo_{12}Bi_1Fe_2Ni_7Pb_2Tl_{0.3}P_{0.08}O_{50.2} \cdot 15SiO_2$ | 525 | 421 | 650 |
| 29 | $Mo_{12}Bi_1Fe_2Ni_7Sn_2Tl_{0.3}P_{0.08}O_{52.2} \cdot 15SiO_2$ | 525 | 408 | 580 |
| 30 | $Mo_{12}Bi_1Fe_1Ni_{1.5}Co_2Cr_2Tl_{0.2}P_{0.08}O_{19.0} \cdot 15SiO_2$ | 525 | 447 | 570 |
| 31 | $Mo_{12}Bi_1Fe_1Co_{8.5}Tl_{0.2}P_{0.08}O_{48.0} \cdot 15SiO_2$ | 525 | 430 | 500 |
| 32 | $Mo_{12}Bi_1Fe_1Co_7Cd_2Tl_{0.2}P_{0.08}O_{48.3} \cdot 15SiO_2$ | 525 | 470 | 600 |
| 33 | $Mo_{12}Bi_1Fe_3Ni_2Co_6K_{0.3}P_1O_{52.7} \cdot 30SiO_2$ | 600 | 430 | 520 |
| 34 | $Mo_{12}Bi_1Fe_2Ni_7Be_2Tl_{0.3}P_{0.08}O_{50.2} \cdot 15SiO_2$ | 525 | 430 | 510 |
| 35 | $Mo_{12}Bi_1Fe_2Mg_2Tl_{0.3}P_{0.08}O_{50.2} \cdot 15SiO_2$ | 525 | 430 | 530 |
| 36 | $Mo_{12}Bi_1Fe_1Ni_{4.5}Co_2Ca_2Tl_{0.2}P_{0.08}O_{48.0} \cdot 15SiO_2$ | 525 | 420 | 560 |
| 37 | $Mo_{12}Bi_1Fe_1Ni_{4.5}Co_2Sr_2Tl_{0.2}P_{0.08}O_{48.0} \cdot 15SiO_2$ | 525 | 442 | 580 |
| 38 | $Mo_{12}Bi_1Fe_2Ni_5Zn_2Sb_1Tl_{0.3}P_{0.08}O_{49.7} \cdot 15SiO_2$ | 525 | 420 | 620 |
| 39 | $Mo_{12}Bi_1Fe_1Ni_{4.5}Co_4W_2Tl_{0.2}P_{0.08}O_{48.0} \cdot 15SiO_2$ | 525 | 462 | 540 |

| Example | Starting materials (molar ratio) | | | | | | Conversion of propylene (%) | Yield of acrylonitrile (%) | Produced amount of HCN (m.mol.g-cat$^{-1}$.hr$^{-1}$) |
|---|---|---|---|---|---|---|---|---|---|
| | Propylene | Methanol | $NH_3$ | $O_2$ | $H_2O$ | $N_2$ | | | |
| 25 | 1 | 0 | 1.4 | 2.7 | 7.2 | 7.2 | 96.0 | 69.9 | 0.27 |
|  | 1 | 0.33 | 1.3 | 2.5 | 6.9 | 7.1 | 95.0 | 68.1 | 0.40 |
| 26 | 1 | 0 | 1.2 | 2.5 | 6.6 | 6.8 | 99.3 | 84.4 | 0.27 |
|  | 1 | 0.33 | 1.2 | 2.4 | 6.2 | 6.7 | 99.4 | 81.0 | 0.43 |
| 27 | 1 | 0 | 1.3 | 2.7 | 7.2 | 7.5 | 100 | 65.4 | 0.33 |
|  | 1 | 0.36 | 1.3 | 2.6 | 6.8 | 7.3 | 100 | 68.3 | 0.48 |
| 28 | 1 | 0 | 1.3 | 2.7 | 7.0 | 7.0 | 99.3 | 75.0 | 0.49 |
|  | 1 | 0.33 | 1.3 | 2.7 | 6.7 | 7.0 | 100 | 73.6 | 0.67 |
| 29 | 1 | 0 | 1.3 | 2.5 | 6.7 | 6.5 | 91.6 | 72.4 | 0.32 |
|  | 1 | 0.32 | 1.3 | 2.5 | 6.4 | 6.8 | 94.0 | 77.8 | 0.49 |
| 30 | 1 | 0 | 1.3 | 2.6 | 7.1 | 6.9 | 99.7 | 80.2 | 0.33 |
|  | 1 | 0.33 | 1.3 | 2.6 | 6.8 | 6.9 | 100 | 81.9 | 0.57 |
| 31 | 1 | 0 | 1.5 | 2.7 | 5.6 | 7.8 | 91.6 | 73.4 | 0.43 |
|  | 1 | 0.26 | 1.5 | 2.8 | 5.3 | 7.6 | 93.3 | 79.9 | 0.55 |
| 32 | 1 | 0 | 1.3 | 2.6 | 7.1 | 6.9 | 94.2 | 79.7 | 0.30 |
|  | 1 | 0.33 | 1.3 | 2.7 | 6.8 | 6.8 | 97.1 | 78.9 | 0.61 |
| 33 | 1 | 0 | 1.2 | 2.2 | 6.3 | 6.3 | 97.0 | 71.4 | 0.31 |
|  | 1 | 0.30 | 1.2 | 2.1 | 6.0 | 6.1 | 96.8 | 72.4 | 0.40 |
| 34 | 1 | 0 | 1.3 | 2.6 | 7.2 | 7.2 | 97.9 | 76.8 | 0.29 |
|  | 1 | 0.36 | 1.3 | 2.6 | 6.8 | 7.0 | 98.0 | 78.7 | 0.46 |
| 35 | 1 | 0 | 1.3 | 2.8 | 7.2 | 7.7 | 100 | 65.3 | 0.42 |
|  | 1 | 0.36 | 1.3 | 2.7 | 6.8 | 7.5 | 100 | 69.8 | 0.51 |
| 36 | 1 | 0 | 1.4 | 2.7 | 7.1 | 7.1 | 97.0 | 69.6 | 0.48 |

Table 5—Continued

| Example | Starting materials (molar ratio) | | | | | | Conversion of propylene (%) | Yield of acrylonitrile (%) | Produced amount of HCN (m.mol.g-cat$^{-1}$.hr$^{-1}$) |
|---|---|---|---|---|---|---|---|---|---|
| | Propylene | Methanol | NH$_3$ | O$_2$ | H$_2$O | N$_2$ | | | |
| | 1 | 0.33 | 1.4 | 2.7 | 6.8 | 7.1 | 99.0 | 72.3 | 0.59 |
| 37 | 1 | 0 | 1.3 | 2.5 | 6.5 | 6.8 | 97.4 | 74.3 | 0.39 |
| | 1 | 0.29 | 1.3 | 2.4 | 6.2 | 6.3 | 98.2 | 77.0 | 0.44 |
| 38 | 1 | 0 | 1.5 | 2.9 | 5.6 | 7.9 | 91.0 | 73.9 | 0.41 |
| | 1 | 0.27 | 1.6 | 3.0 | 5.3 | 8.1 | 91.0 | 74.8 | 0.60 |
| 39 | 1 | 0 | 1.4 | 2.7 | 7.3 | 7.0 | 94.0 | 75.5 | 0.31 |
| | 1 | 0.34 | 1.4 | 2.7 | 7.0 | 7.1 | 95.6 | 74.5 | 0.49 |

EXAMPLE 40

In a glass made reaction tube of 12 mm in inner diameter, the same catalyst composition as in Example 24 (6 g) is charged and heated up to 428°C. An aqueous dilution of formalin (an aqueous solution containing 37% by weight of formaldehyde and about 7% by weight of methanol) is introduced into the reaction tube together with a mixture of propylene, ammonia, oxygen and nitrogen, the molar ratio of propylene, formaldehyde, methanol, ammonia, oxygen, steam and nitrogen being 1 : 0.30 : 0.05 : 1.2 : 2.7 : 6.8 : 7.2, at a space velocity of 500 hr$^{-1}$, whereby the following results are obtained: conversion of propylene, 95.4%; yield of acrylonitrile, 82%; produced amount of hydrogen cyanide, 0.63 mmol.g-cat$^{-1}$hr$^{-1}$.

When the reaction is carried out under the same conditions in the absence of the mixture of formaldehyde and methanol, the conversion of propylene and the yield of acrylonitrile are not changed, but the produced amount of hydrogen cyanide is reduced to 0.28 mmol.g-cat$^{-1}$hr$^{-1}$.

EXAMPLES 41 to 42

As in Examples 1 and 2, there is prepared the catalyst compositions as shown in Table 6.

Using these catalyst compositions, the ammoxidation reaction is carried out as in Example 40 but changing the space velocity and the reaction temperature.

The results are shown in Table 6.

EXAMPLE 43

In a glass made reaction tube of 12 mm in inner diameter, there is charged a catalyst composition (6 g) prepared as in Examples 1 and 2 whose components correspond to the formula: $Mo_{12}Bi_1Fe_2Ni_7Zn_2Tl_{0.5}P_{0.2}$ $O_{50.5}$·15SiO$_2$. After heating the catalyst composition up to 410°C, a gaseous mixture of isobutylene, ammonia, oxygen, steam, and nitrogen (1 : 1.1 : 2.5 : 8.4 : 10.2 in molar ratio) is introduced into the reaction tube at a space velocity of 700 hr$^{-1}$ to execute the ammoxidation reaction. The conversion of isobutylene is 99.7%, the yield of methacrylonitrile is 70.0% and the produced amount of hydrogen cyanide is 0.28 mmol.g-cat$^{-1}$·hr$^{-1}$.

When a gaseous mixture of isobutylene, methanol, ammonia, oxygen, steam and nitrogen (1 : 0.39 : 1.1 : 2.5 : 7.5 : 10.2 in molar ratio) is contacted with the same catalyst composition under the same conditions as above, the conversion of isobutylene and the yield of methacrylonitrile are 99.4% and 68.0%, respectively. The produced amount of hydrogen cyanide is increased to 0.46 mmol.g-cat$^{-1}$·hr$^{-1}$.

EXAMPLE 44

A solution of bismuth nitrate (194 g) in a mixture of 60% by weight nitric acid (40 ml) and water (360 ml) and a solution of thallium nitrate (53.3 g), ferric nitrate (162 g), nickel nitrate (523 g) and cobalt nitrate (466 g) in water (2.5 liter) are combined together. To the resultant mixture, a solution of ammonium molybdate (848 g) and concentrated phosphoric acid (85% by weight, 2 ml) in water (2.4 liter) is added, and the mixture is stirred well to make a dispersion. Then, silica sol (SiO$_2$, 20% by weight, 5.33 liter) is added thereto under vigorous stirring. The resultant dispersion is dried by the aid of a spray drier while stirring, and the dried product is calcined at 550°C for 6 hours in the atmosphere to obtain a catalyst composition of 100 μ or less in particle size whose components correspond to the formula: $Mo_{12}Bi_1Fe_1Ni_{4.5}Co_4P_{0.08}Tl_{0.5}O_{48.4}$·50SiO$_2$.

Table 6

| Example | Catalyst Composition | Temperature on 2nd calcination (°C) | Reaction temperature (°C) | Space velocity (hr$^{-1}$) | Conversion of propylene (%) | Yield of acrylonitrile (%) | Produced amount of HCN (m.mol.g-cat$^{-1}$.hr$^{-1}$) |
|---|---|---|---|---|---|---|---|
| 41 | $Mo_{12}Bi_1Fe_{1.5}Co_2Na_1P_1O_{38.3}$·60SiO$_2$ | 690 | 450 | 540 | 84.6 / 79.0* | 66.2 / 66.0* | 0.32 / 0.48* |
| 42 | $Mo_{12}Bi_9Fe_9P_{1.5}O_{66.8}$·50SiO$_2$ | 550 | 428 | 610 | 89.2 / 87.6* | 40.3 / 45.7* | 0.60 / 0.71* |

Note: *The reaction is carried out under the same condition in the pressure of the formaldehyde and methanol.

In a stainless steel made reaction vessel of fluidized layer of 28 mm in inner diameter, the thus obtained catalyst composition (250 g) is charged and heated up to 430°C while passing air through the vessel at a flowing rate of 500 STP ml/min. Then, a gaseous mixture of propylene, ammonia and air (1 : 1.1 : 9 in molar ratio) is introduced into the vessel to execute the ammoxidation reaction. The contact time is 7.5 seconds. The conversion of propylene is 96%, the yield of acrylonitrile is 74.6% and the produced amount of hydrogen cyanide is 11.7 mmol/hr.

When the reaction is executed in the presence of methanol at 430°C for 7.1 seconds of contact time, the molar ratio of propylene, methanol, ammonia and air being 1 : 0.26 : 1.3 : 10.5, the following results are obtained: the conversion of propylene, 97%; the yield of acrylonitrile, 74.0%; the produced amount of hydrogen cyanide, 48.5 mmol/min.

What is claimed is:

1. A process for preparing hydrogen cyanide which comprises reacting methanol or formaldehyde or a mixture thereof, ammonia and oxygen in the presence of a catalyst composition at a temperature of 250° to 550°C. and a space velocity of 50 to 5,000 hour$^{-1}$ under a pressure of 0.5 to 10 atmospheres, the said catalyst composition consisting essentially of a catalyst system of the formula: $Mo_aBi_bFe_cX_dY_eZ_fO_g$ wherein X is one or more of Cr, Mn, Co, Ni, Zn, Cd, Sn, W and Pb, Y is one or more of Tl and elements belonging to Group IA or IIA of the Periodic Table, Z is one or more of P, As and Sb and $a, b, c, d, e, f$ and $g$ each represent the number of atoms wherein $a$ is 12, $b$ is 0.1 to 15, $c$ is 0.1 to 12, $d$ is 2 to 15, $e$ is 0 to 12, $f$ is 0 to 5 and $g$ is the total number of oxygen atoms and is a number determined by the valence requirements of the other atoms in the catalyst composition.

2. The process according to claim 1, wherein the reaction is effected in the presence of an olefin selected from the group consisting of propylene and isobutylene.

3. The process according to claim 1, wherein the molar ratio of methanol or formaldehyde or the mixture thereof to ammonia to oxygen is 1 : 0.7 to 3 : 1 to 5.

4. The process according to claim 3, wherein said molar ratio is 1 : 0.9 to 2 : 1 to 3.

5. The process according to claim 1, wherein the reaction is effected at a temperature of 300° to 500°C.

6. The process according to claim 1, wherein the reaction is effected at a space velocity of 100 to 2,000 hour$^{-1}$.

7. The process according to claim 1, wherein the reaction is carried out in the presence of steam in an amount effective to suppress the possibility of explosion and to increase the selectivity to hydrogen cyanide and to the unsaturated nitrile, the amount of steam being not more than 20 mol per mol of methanol or formaldehyde or their mixture.

8. The process according to claim 1, wherein the reaction is carried out in the presence of steam in an amount of 1 to 15 mol per mol of methanol or formaldehyde or their mixture.

9. The process according to claim 1, wherein the reaction is carried out in the presence of an inert gas selected from the group consisting of nitrogen, argon, carbon dioxide and steam as a diluent.

10. A process for preparing hydrogen cyanide by the vapor phase catalytic reaction of methanol or formaldehyde or a mixture thereof with ammonia and oxygen in the presence of a solid catalyst at an elevated temperature which comprises using a catalyst composition consisting essentially of a catalyst system of the formula: $Mo_aBi_bFe_cX_dY_eZ_fO_g$ wherein X is one or more of Cr, Mn, Co, Ni, Zn, Cd, Sn, W and Pb, Y is one or more of Tl and elements belonging to Group IA or IIA of the Periodic Table, Z is one or more of P, As and Sb and $a, b, c, d, e, f$ and $g$ each represent the number of atoms wherein $a$ is 12, $b$ is 0.1 to 15, $c$ is 0.1 to 12, $d$ is 2 to 15, $e$ is 0 to 12, $f$ is 0 to 5 and $g$ is the total number of oxygen atoms and is a number determined by the valence requirements of the other atoms in the catalyst composition as the solid catalyst.

11. The process according to claim 10, wherein the reaction is effected in the presence of an olefin selected from the group consisting of propylene and isobutylene.

12. A process for preparing hydrogen cyanide by the vapor phase catalytic reaction of methanol or formaldehyde or a mixture thereof with ammonia and oxygen in the presence of a solid catalyst at an elevated temperature which comprises using a catalyst composition consisting essentially of a catalyst system of the formula: $Mo_aBi_bFe_cX_dY_eZ_fPb_hO_g$ wherein X is one or more of Cr, Mn, Co, Ni and Zn, Y is one or more of Tl and elements belonging to Group IA or IIA of the Periodic Table, Z is one or more of P, As and Sb and $a, b, c, d, e, f, h$ and $g$ each represent the number of atoms wherein $a$ is 12, $b$ is 0.1 to 24, $c$ is 0 to 24, $d$ is 0 to 15, $e$ is 0 to 15, $f$ is 0 to 5, $h$ is 0 to 6 and $g$ is the total number of oxygen atoms and is a number determined by the valence requirements of the other atoms in the catalyst composition as the solid catalyst, provided that $b + f$ is not more than 24, $c + d$ is not more than 24, the number of atoms of the element(s) belonging to Group IA or IIA of the Periodic Table does not exceed 12 and the total number of Tl and Pb does not exceed 6.

13. A process for preparing an unsaturated nitrile and hydrogen cyanide similtaneously which comprises reacting an olefin selected from the group consisting of propylene and isobutylene with ammonia and oxygen in the presence of at least one of methanol and formaldehyde using a catalyst composition at a temperature of 300° to 550°C. and a pressure of 0.5 to 10 atmospheres, the said catalyst composition consisting essentially of a catalyst system of the formula: $Mo_aBi_bFe_cX_dY_eZ_fO_g$ wherein X is one or more of Cr, Mn, Co, Ni, Zn, Cd, Sn, Pb and W, Y is one or more of Tl and elements belonging to Group IA or IIA of the Periodic Table, Z is one or more of P, As and Sb and $a, b, c, d, e, f$ and $g$ each represent the number of atoms wherein $a$ is 12, $b$ is 0.1 to 24, $c$ is 0 to 24, $d$ is 0 to 15, $e$ is 0 to 15, $f$ is 0 to 5 and $g$ is the total number of oxygen atoms and is a number determined by the valence requirements of the other atoms in the catalyst composition.

14. The process according to claim 13, wherein the molar ratio of ammonia with respect to the combined amount of methanol or formaldehyde or their mixture and the olefin is 0.7 to 2.

15. The process according to claim 14, wherein said molar ratio is 0.9 to 1.3.

16. The process according to claim 13, wherein 0.05 to 6% by volume of oxygen is contained in the gaseous reaction product formed during the reaction.

17. The process according to claim 16, wherein the amount of oxygen in the gaseous reaction product is 0.1 to 3% by volume.

18. The process according to claim 13, wherein the reaction is carried out in the presence of steam in an amount of 2 to 15 mol per mol of the combined amount of methanol or formaldehyde or their mixture and the olefin.

19. The process according to claim 13, wherein the reaction is carried out in the presence of an inert gas selected from the group consisting of nitrogen, argon, carbon dioxide and steam as a diluent.

20. The process according to claim 13, wherein $a$ is 12, $b$ is 0.1 to 15, $c$ is 0.1 to 12, $d$ is 2 to 15, $e$ is 0 to 12, $f$ is 0 to 5 and $g$ is 47 to 66.8.

21. The process according to claim 13, wherein the reaction is carried out at a temperature of 350° to 500°C.

22. The process according to claim 13, wherein the molar ratio of methanol or formaldehyde or their mixture to the olefin is not more than 3.

23. The process according to claim 22, wherein the molar ratio is 0.05 to 1.

* * * * *

UNITED STATES PATENT AND TRADEMARK OFFICE
CERTIFICATE OF CORRECTION

PATENT NO. : 3,911,089
DATED : October 7, 1975
INVENTOR(S) : T. Shiraishi et al

It is certified that error appears in the above—identified patent and that said Letters Patent is hereby corrected as shown below:

Column 1, last line

Change "tablee" to --table--

Column 3, line 26

Change "1 mmol" to --0.075 mmol--

Table 3 (upper half) under the heading "Example", line 3

Change "3" to --4--

Table 5 (upper half) under the heading "Composition", line 11

Change "$Mo_{12}Bi_1Fe_2Mg_2Tl_{0.3}P_{0.08}O_{50.2} \cdot 15SiO_2$" to

--$Mo_{12}Bi_1Fe_2Ni_7Mg_2Tl_{0.3}P_{0.08}O_{50.2} \cdot 15SiO_2$--

In the Note under Table 6

Change "pressure" to --presence--

Signed and Sealed this

Seventh Day of July 1981

[SEAL]

Attest:

RENE D. TEGTMEYER

Attesting Officer     Acting Commissioner of Patents and Trademarks